Sept. 2, 1947.　　　A. L. PARKER　　　2,426,900
FLUID PRESSURE OPERATED VALVE
Filed May 15, 1945
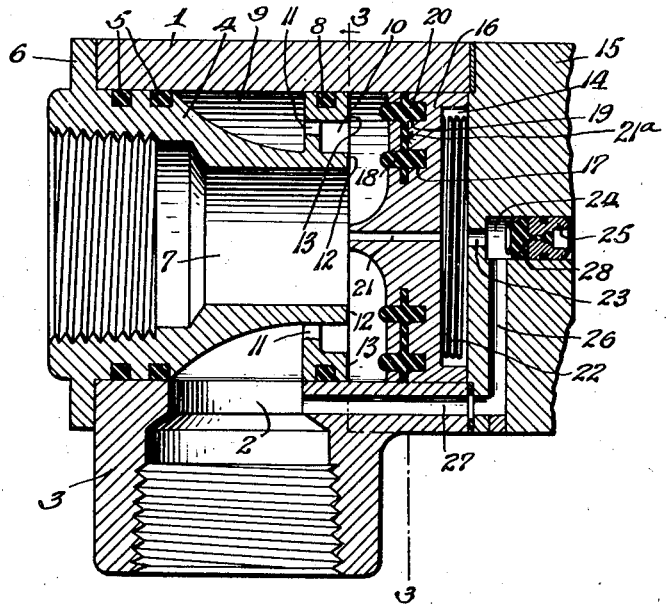
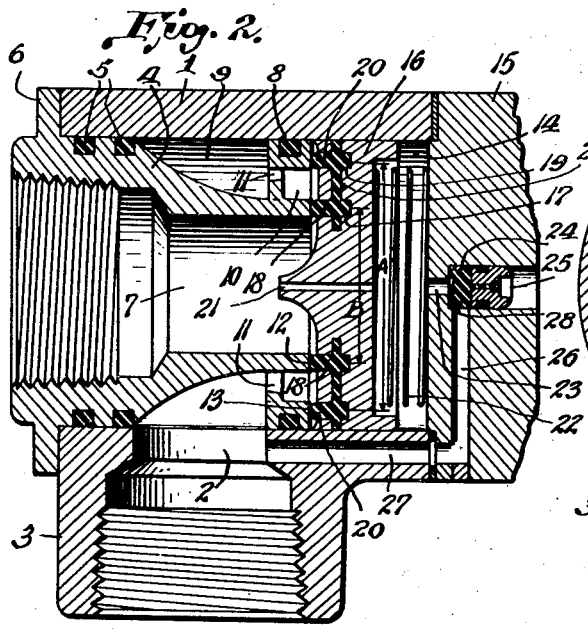
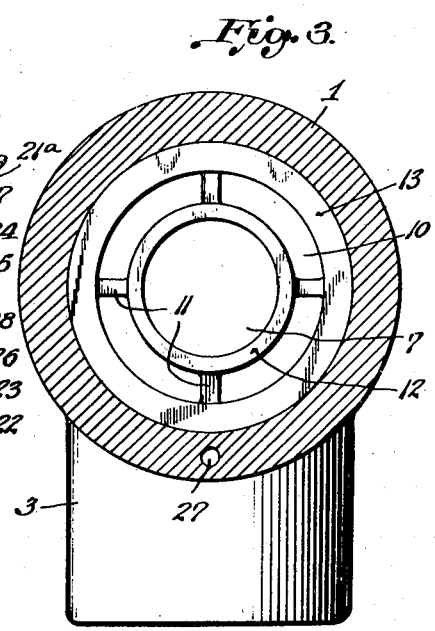
INVENTOR.
Arthur L. Parker, deceased,
by Helen M. Parker, executrix.
BY
Mason, Porter & Diller
ATTORNEYS.

Patented Sept. 2, 1947

2,426,900

UNITED STATES PATENT OFFICE 2,426,900

FLUID PRESSURE OPERATED VALVE

Arthur L. Parker, deceased, late of Cleveland, Ohio, by Helen M. Parker, executrix, Shaker Heights, Ohio, assignor to The Parker Appliance Company, Cleveland, Ohio, a corporation of Ohio Application May 15, 1945, Serial No. 593,795

7 Claims. (Cl. 137—139)

1

The invention relates to new and useful improvements in a fluid pressure operated valve, which while capable of general use is more particularly adapted for operation in connection with a control pilot valve.

An object of the invention is to provide a valve assembly wherein the main valve is operated by fluid pressure controlled by a pilot valve so that when said pilot valve is in closed position the fluid pressure operating on the main valve will close the same, and when the pilot valve is in open position the fluid pressure operating on the main valve will open the same.

A further object of the invention is to provide a valve casing having an adapter so constructed as to close one end of the casing and divide the same into inner and outer chambers which are concentrically disposed and wherein communication between the chambers is through ports disposed between spaced annular valve seats at the inner end of the adapter and wherein said ports are closed by a valve mounted for free movement in said casing and adapted to make sealing contact with both seats.

A further object of the invention is to provide a valve assembly of the above type, wherein the casing and the valve are so constructed that the valve is moved by differential fluid pressure upon opposite sides thereof.

A still further object of the invention is to provide a fluid pressure operated valve of the above type wherein the differential in the pressures is controlled by a pilot valve.

These and other objects will in part be obvious and will in part be hereinafter more fully disclosed.

In the drawing:

Figure 1 is a view showing more or less diagrammatically and in longitudinal section a valve assembly embodying the improvements, the valve being unseated so as to provide a free fluid communication between the inlet and outlet openings of the valve assembly.

Figure 2 is a view similar to Figure 1, but showing the valve closed.

Figure 3 is a sectional view on the line 3—3 of Figure 1.

The valve assembly embodying the improvements includes a cylindrical valve casing 1 having an opening 2 in the side wall thereof, which is surrounded by a boss 3 to which an adapter may be connected.

Disposed within the cylindrical casing 1 is an adapter 4. This adapter is so dimensioned as to contact with the inner wall of the casing

2 adjacent the end of the casing. Ring sealing gaskets 5, 5 disposed in suitable annular recesses in the adapter make sealing contact with the inner wall of the casing. This adapter has a flange 6 which overlies the end of the casing and the adapter is secured thereto by any suitable means (not shown). The adapter is provided with a fluid passage 7.

The adapter at its inner end makes contact with the inner wall of the casing 1. This inner end portion is provided with an annular channel on which is disposed a sealing gasket 8. The adapter between the inner and outer ends thereof is cut away so as to provide an annular chamber 9 which surrounds the adapter.

The inner end of the adapter is provided with an annular channel 10 and at spaced intervals there are ports 11 which connect the annular channel 10 with the chamber 9.

The inner end of the adapter is provided with an annular valve seat 12 and an annular valve seat 13. These valve seats are spaced from each other by the channel 10. The valve seats lie in the same plane which in the illustrated embodiment of the invention is at right angles to the longitudinal axis of the valve casing 1. The ports 11 serve as a communication between the passage 7 through the adapter and the chamber 9 surrounding the adapter.

The adapter terminates short of the end of the casing and provides a cylindrical chamber 14 for a valve. The casing is closed by a head 15 which may be secured in any suitable way to the casing. Located in this valve chamber 14 is a valve disk 16. Said valve disk is so dimensioned that it is free to slide lengthwise of the casing. There are no gaskets between the valve and the inner wall of the casing, so that the valve will slide freely in the casing. The valve is provided on its inner face with an annular recess 17 in which is disposed a gasket 18 that projects from the inner face of the valve and is so positioned that when the valve is closed, the gasket will engage the valve seat 12. Also disposed in the valve is a second annular recess 19 containing a gasket 20 which is adapted to engage the valve seat 13. These annular gaskets are preferably made of rubber and they are held in the valve by several radial drills 21a, one of which is shown in Figure 2. The rubber flows into the radial passages connecting the annular recesses when the rings are molded into the valve member.

The valve 16 has a central passage 21 leading from the inner side of the valve to the outer side of the valve and forming a fluid connection between the valve chamber at the outer side of the valve and the fluid passage 7 through the adapter. When the valve is in open position, as shown in Figure 1, this passage forms a communication between the valve chamber at the outer side of the valve and the valve chamber at the inner side of the valve. The valve chamber at the inner side of the valve, when the valve is open, also provides communication between the inlet passage 7 and the cylindrical chamber 9, and from the cylindrical chamber to the outlet through the opening 2 in the side wall of the casing. When the valve is moved to closed position so that the rubber gaskets contact with the valve seats, then the ports are closed. At this time, however, the passage 21 through the valve is open so that the chamber at the outer side of the valve is in communication with the passage 7 through the adapter.

A coiled spring 22 is disposed between the valve and the head 15, and tends to move the valve toward closed position.

There is a passage 23 in the head 15 which leads to a chamber 24 in which is located a pilot valve 25. There is a port 26 leading from the side of the chamber 24, which port is connected to a port 27 in the valve casing, and the port 27 is connected with the cylindrical chamber 9 at the outlet side of the valve. This pilot valve is provided with the usual packing and also with a gasket 28 which engages the inner wall of the chamber 24 so as to close the opening 23. When the pilot valve is moved to the left to the position shown in Figure 2, when the passage 23 is closed, and connection between the valve chamber at the outer side of the valve and the outlet is cut off. When the pilot valve is moved to open position as shown in Figure 1, then the chamber at the outer side of the valve is connected with the outlet. This pilot valve may be spring closed as shown in the Parker Patents 2,351,871 and 2,351,873 granted June 20, 1944. The pilot valve may be controlled manually or by any suitable means. As far as the present invention is concerned, the means for moving the pilot valve is immaterial.

As shown in Figure 2, the pilot valve is closed and the main valve is also closed. The fluid pressure in the valve chamber on the outer side of the valve is the same as the fluid pressure on the inner side of the valve. The area indicated at A is subjected to the fluid pressure on the outer side of the valve and the area indicated by B is subjected to the fluid pressure on the inner side of the valve. It will be noted, therefore, that there is a differential in the fluid pressures operating upon the valve, and that the fluid pressure operating upon the outer side of the valve is much greater.

This, together with the force exerted by the spring, moves the valve to closed position and holds it firmly seated. The two seals 18 and 20, together with the sealing gasket 8, prevent passage of any fluid from the inlet side to the chamber 9 and thus to the outlet side. While the valve moves freely in the casing, and there is no packing between the contacting surfaces of the valve and the casing, any fluid leaking around the valve is trapped by the gasket 20.

If the pilot valve is moved to open position by any suitable means, a connection will be established in the chamber 14 with the outlet through the ports 26 and 27. These ports are larger than the passage 21 through the valve and fluid will pass from the chamber 14 to the outlet faster than it can be replenished through this passage 21, and, therefore, the pressure on the chamber 21 will be considerably less than the pressure on the inner side of the valve.

This pressure differential forces the valve 19 away from its seats 12 and 13. In Figure 1, the valve is shown in its open position and fluid is free to flow from the inlet passage 7 through the ports 11 to the cylindrical chamber 9 and thus to the outlet.

From the above, it will be noted that the gaskets associated with the valve only function when the valve is in closed position, and they do not in any way interfere with the free movement of the valve in the valve chamber. It will also be noted that when the valve is in closed position that the gaskets contacting with the valve seats at opposite sides of the channel 10 will prevent any leakage of fluid from the inlet passage 7 directly to the ports 11, or through the passage 21, the outer chamber 14, and around the valve to the ports 11.

It is obvious that many changes in the details of construction and the arrangement of parts may be made without departing from the spirit of the invention as set forth in the appended claims.

What is claimed is:

1. A valve comprising a casing, an adapter having a sealed connection with said casing adjacent one end thereof, and a sealed connection with said casing at a point spaced inwardly therefrom, said adapter being spaced away from said casing intermediate said sealed connections to provide a fluid chamber surrounding the adapter, said casing having a fluid passage in the side wall thereof connected with said chamber, said adapter having spaced annular valve seats at its inner end disposed in the same plane, ports in the adapter disposed between said seats for connecting said fluid chamber to the fluid passage in said adapter, and a valve adapted to engage said seats for closing the ports.

2. A valve comprising a casing, an adapter having a sealed connection with said casing adjacent one end thereof, and a sealed connection with said casing at a point spaced inwardly therefrom, said adapter being spaced away from said casing intermediate said sealed connections to provide a fluid chamber surrounding the adapter, said casing having a fluid passage in the side wall thereof connected with said chamber, said adapter having spaced annular valve seats at its inner end disposed in the same plane, ports in the adapter disposed between said seats for connecting said fluid chamber to the fluid passage in said adapter, a valve adapted to engage said seats for closing the ports, and means whereby said valve is moved toward and from said seats by a differential in the fluid pressures operating upon opposite sides of said valve.

3. A valve comprising a casing, an adapter having a sealed connection with said casing adjacent one end thereof, and a sealed connection with said casing at a point spaced inwardly therefrom, said adapter being spaced away from said casing intermediate said sealed connections to provide a fluid chamber surrounding the adapter, said casing having a fluid passage in the side wall thereof connected with said chamber, said adapter having spaced annular valve seats at its inner end disposed in the same plane, ports in the adapter disposed between said seats for connecting said fluid chamber to the fluid passage in said adapter, a valve adapted to engage said seats for closing the ports, means whereby said valve is moved toward and from said seats by a differential in the fluid pressures operating upon opposite sides of said valve, and a pilot valve for controlling the differential in the pressure bearing on opposite sides of said valve.

4. A valve comprising a casing, an adapter having a sealed connection with said casing adjacent one end thereof, and a sealed connection with said casing at a point spaced inwardly therefrom, said adapter being spaced away from said casing intermediate said sealed connections to provide a fluid chamber surrounding the adapter, said casing having a fluid passage in the side wall thereof connected with said chamber, said adapter having spaced annular valve seats at its inner end disposed in the same plane, ports in the adapter disposed between said seats for connecting said fluid chamber to the fluid passage in said adapter, and a valve adapted to engage said seats for closing the ports, said valve being provided with spaced ring gaskets adapted to engage the valve seats.

5. A valve comprising a casing, an adapter having a sealed connection with said casing adjacent one end thereof, and a sealed connection with said casing at a point spaced inwardly therefrom, said adapter being spaced away from said casing intermediate said sealed connections to provide a fluid chamber surrounding the adapter, said casing having a fluid passage in the side wall thereof connected with said chamber, said adapter having spaced annular valve seats at its inner end disposed in the same plane, ports in the adapter disposed between said seats for connecting said fluid chamber to the fluid passage in said adapter, said adapter being spaced from the opposite end of said casing to provide a chamber for a valve, means for closing said opposite end of the casing, a valve disposed in said valve chamber and movable toward and from the valve seats by a differential in fluid pressures on the opposite sides of said valve, said valve having a relatively small passage centrally therethrough for connecting the chambers at the inner and outer sides of said valve.

6. A valve comprising a casing, an adapter having a sealed connection with said casing adjacent one end thereof, and a sealed connection with said casing at a point spaced inwardly therefrom, said adapter being spaced away from said casing intermediate said sealed connections to provide a fluid chamber surrounding the adapter, said casing having a fluid passage in the side wall thereof connected with said chamber, said adapter having spaced annular valve seats at its inner end disposed in the same plane, ports in the adapter disposed between said seats for connecting said fluid chamber to the fluid passage in said adapter, said adapter being spaced from the opposite end of said casing to provide a chamber for a valve, means for closing said opposite end of the casing, a valve disposed in said valve chamber and movable toward and from the valve seats by a differential in fluid pressures on the opposite sides of said valve, said valve having a relatively small passage centrally therethrough for connecting the chambers at the inner and outer sides of said valve, and a pilot valve for controlling a passage connecting the chamber at the outer side of said valve with the chamber surrounding the adapter.

7. A valve comprising a casing, an adapter having a sealed connection with said casing adjacent one end thereof, and a sealed connection with said casing at a point spaced inwardly therefrom, said adapter being spaced away from said casing intermediate said sealed connections to provide a fluid chamber surrounding the adapter, said casing having a fluid passage in the side wall thereof connected with said chamber, said adapter having spaced annular valve seats at its inner end disposed in the same plane, ports in the adapter disposed between said seats for connecting said fluid chamber to the fluid passage in said adapter, said adapter being spaced from the outer end of said casing to form a valve chamber, a valve having free sliding movement in said chamber, a spring for moving said valve toward closed position, said valve having a passage centrally therethrough connecting the passage in the adapter to the valve chamber at the outer side of the valve, said valve having spaced annular recesses on the inner face thereof, gaskets disposed in said recesses and projecting therefrom and adapted to engage the valve seats, means connected to the valve casing for closing the valve chamber, said means having a passage leading from said valve chamber to the chamber surrounding the adapter, and a pilot valve for controlling the passage leading from the valve chamber to the chamber surrounding the adapter whereby at will the differential pressures on the inner and outer sides of the valve may be varied for opening and closing said valve.

HELEN M. PARKER.
*Executrix of the Estate of Arthur L. Parker, Deceased.*

REFERENCES CITED

The following references are of record in the file of this patent:

UNITED STATES PATENTS

| Number | Name | Date |
|---|---|---|
| 1,005,703 | Goeddel | Oct. 10, 1911 |
| 1,035,898 | Pasman | Aug. 20, 1912 |
| 789,561 | Pasman | May 9, 1905 |
| 696,135 | Curtis | Mar. 25, 1902 |